(12) United States Patent
Michalak et al.

(10) Patent No.: US 9,969,310 B2
(45) Date of Patent: May 15, 2018

(54) SYSTEM AND METHOD FOR MANUFACTURING A VEHICLE INTERIOR COMPONENT HAVING AN EMBEDDED RADIO FREQUENCY IDENTIFICATION TAG

(71) Applicant: JOHNSON CONTROLS TECHNOLOGY COMPANY, Holland, MI (US)

(72) Inventors: Eric B. Michalak, Northville, MI (US); Michael John Thomas, Ann Arbor, MI (US)

(73) Assignee: ADIENT LUXEMBOURG HOLDING S.A.R.L., Luxembourg (LU)

( * ) Notice: Subject to any disclaimer, the term of this patent is extended or adjusted under 35 U.S.C. 154(b) by 230 days.

(21) Appl. No.: 14/649,382

(22) PCT Filed: Dec. 5, 2013

(86) PCT No.: PCT/US2013/073380
§ 371 (c)(1),
(2) Date: Jun. 3, 2015

(87) PCT Pub. No.: WO2014/089333
PCT Pub. Date: Jun. 12, 2014

(65) Prior Publication Data
US 2015/0329033 A1    Nov. 19, 2015

Related U.S. Application Data

(60) Provisional application No. 61/733,770, filed on Dec. 5, 2012.

(51) Int. Cl.
*B60N 2/70*  (2006.01)
*B29C 44/12*  (2006.01)
*B60N 2/00*  (2006.01)
*B29K 105/04*  (2006.01)
*B29K 75/00*  (2006.01)
*B29L 31/00*  (2006.01)
*B29L 31/30*  (2006.01)

(52) U.S. Cl.
CPC ........ *B60N 2/7017* (2013.01); *B29C 44/1266* (2013.01); *B29C 44/1271* (2013.01);
(Continued)

(58) Field of Classification Search
CPC .. B60N 2/7017; B60N 2/002; B29C 44/1266; B29C 44/1271; Y10T 428/249953;
(Continued)

(56) References Cited

U.S. PATENT DOCUMENTS

| | | | |
|---|---|---|---|
| 4,936,627 A * | 6/1990 | Guim | ................... B60N 2/3084 297/238 |
| 2002/0001694 A1 * | 1/2002 | Wetzel | ................ B29C 33/0033 428/131 |

(Continued)

FOREIGN PATENT DOCUMENTS

| | | |
|---|---|---|
| CA | 2 576 699 A1 | 8/2008 |
| DE | 10 2008 005103 A1 | 7/2009 |

(Continued)

*Primary Examiner* — Milton Nelson, Jr.
(74) *Attorney, Agent, or Firm* — McGlew and Tuttle, P.C.

(57) ABSTRACT

A method for manufacturing a vehicle interior component includes depositing an expanding foam within an internal cavity of a mold. The internal cavity is shaped to form the vehicle interior component. The method also includes placing a radio frequency identification (RFID) tag in a desired position and/or orientation on a surface of the expanding foam such that the expanding foam bonds to the RFID tag as the expanding foam cures.

14 Claims, 5 Drawing Sheets

(52) U.S. Cl.
CPC .......... B60N 2/002 (2013.01); *B29K 2075/00* (2013.01); *B29K 2105/04* (2013.01); *B29L 2031/30* (2013.01); *B29L 2031/771* (2013.01); *Y10T 428/249953* (2015.04)

(58) Field of Classification Search
CPC ............ B29K 2105/04; B29K 2075/00; B29L 2031/771; B29L 2031/30
USPC ................................ 297/250.1, 238; 165/47
See application file for complete search history.

(56) References Cited

U.S. PATENT DOCUMENTS

| | | | | |
|---|---|---|---|---|
| 2004/0090099 | A1* | 5/2004 | Chen | B29C 44/1214 297/250.1 |
| 2004/0238623 | A1* | 12/2004 | Asp | B29C 45/14811 235/380 |
| 2006/0139159 | A1 | 6/2006 | Lee et al. | |
| 2009/0166429 | A1* | 7/2009 | Aylmore | B29C 44/086 235/488 |
| 2011/0018689 | A1* | 1/2011 | McAllister | B65C 9/1865 340/10.1 |

FOREIGN PATENT DOCUMENTS

| | | |
|---|---|---|
| DE | 10 2009 036337 A1 | 2/2011 |
| EP | 1 462 349 A1 | 9/2004 |
| EP | 2 017 057 A1 | 1/2009 |
| GB | 2 425 505 A | 11/2006 |

* cited by examiner

SYSTEM AND METHOD FOR MANUFACTURING A VEHICLE INTERIOR COMPONENT HAVING AN EMBEDDED RADIO FREQUENCY IDENTIFICATION TAG

BACKGROUND

The invention relates generally to a system and method for manufacturing a vehicle interior component having an embedded radio frequency identification tag.

Vehicle seating typically includes a seat bottom and a seat back to support a driver or passenger. In certain seating configurations, both the seat bottom and seat back include a rigid chassis, cushions, and a fabric covering. The cushions are coupled to the rigid chassis, and the fabric covering is disposed about the assembly. The rigid chassis of the seat bottom serves to support the weight (i.e., vertical load) of the occupant, and couples the seat to a floor of the vehicle. Further, the seat cushions provide padding that enhances the comfort of the occupant.

Certain interior components, such as seat cushions, are constructed by injecting an expandable liquid into a mold to form a foam cushion having the shape of the mold cavity. A variety of expandable liquids may be used to create cushions having different firmnesses and/or weights. In addition, different mold cavities may be employed to form cushions having different shapes. Accordingly, identification of individual components throughout the manufacturing process, as well as during post-production maintenance of components within the vehicle, is desirable to facilitate differentiation of similar components. For example, a bar code tag may be coupled to certain cushions to facilitate identification of the cushion with a bar code reader. Unfortunately, the process of attaching bar code tags to vehicle components is time-consuming, thereby increasing the manufacturing cost of the components. In addition, bar code tags may be obscured or blocked by other interior components, thereby increasing the difficulty associated with identifying an installed component.

BRIEF DESCRIPTION

The present invention relates to a method for manufacturing a vehicle interior component including depositing an expanding foam within an internal cavity of a mold. The internal cavity is shaped to form the vehicle interior component. The method also includes placing a radio frequency identification (RFID) tag in a desired position and/or orientation on a surface of the expanding foam such that the expanding foam bonds to the RFID tag as the expanding foam cures.

The present invention also relates to a vehicle interior component prepared by a process including depositing an expanding foam within an internal cavity of a mold. The internal cavity is shaped to form the vehicle interior component. The process also includes placing a radio frequency identification (RFID) tag in a desired position and/or orientation on a surface of the expanding foam such that the expanding foam bonds to the RFID tag as the expanding foam cures.

The present invention further relates to a system for manufacturing a vehicle interior component including a mold having an internal cavity shaped to form the vehicle interior component. The internal cavity is configured to receive expanding foam. The system also includes a hopper configured to place a radio frequency identification (RFID) tag in a desired position and/or orientation on a surface of the expanding foam such that the expanding foam bonds to the RFID tag as the expanding foam cures.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
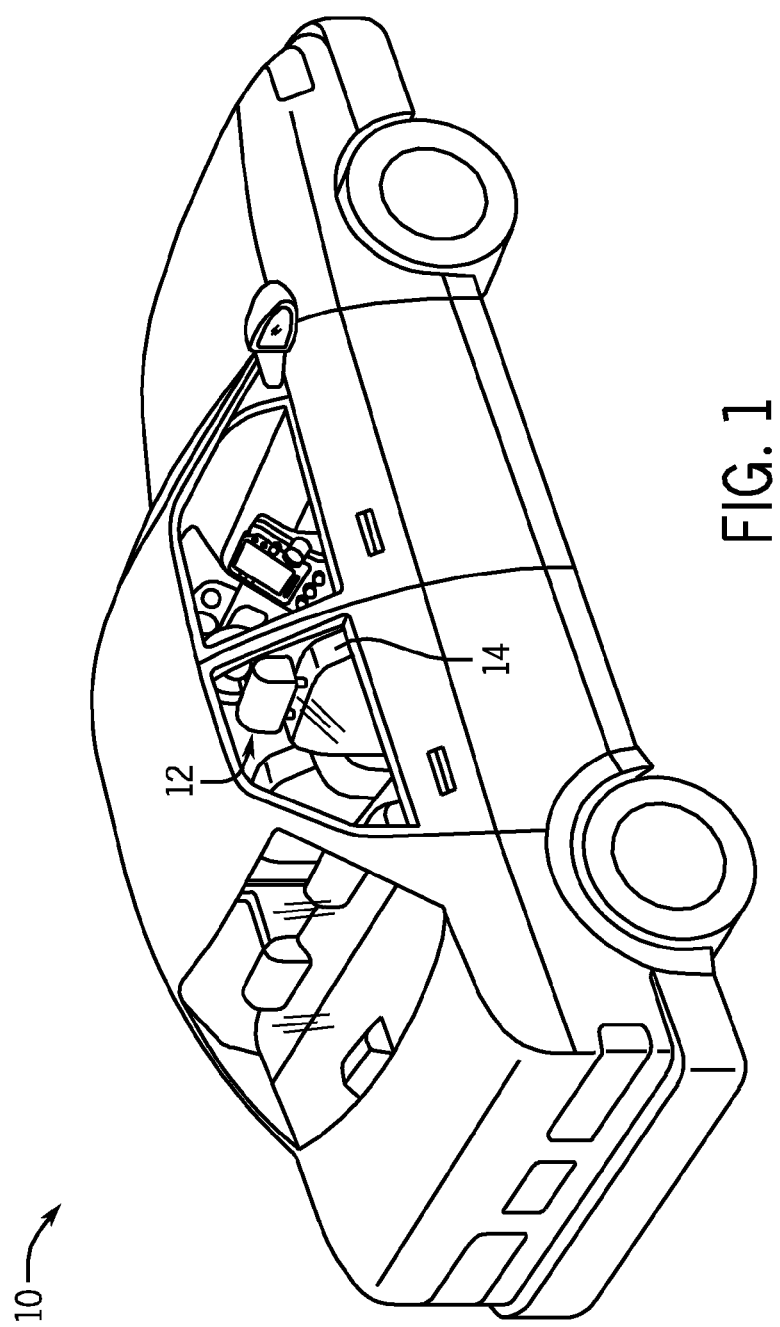
FIG. 1 is a perspective view of an exemplary vehicle that may include an interior component having an embedded radio frequency identification (RFID) tag.

FIG. 1 is a perspective view of an exemplary vehicle 10 that may include an interior component having an embedded radio frequency identification (RFID) tag. As illustrated, the vehicle 10 includes an interior 12 having a seat 14. As discussed in detail below, the seat 14 may include seat cushions having embedded RFID tags. The embedded RFID tags may substantially reduce the time and effort associated with identifying and/or tracking components of the seat, or the seat as a whole. In certain embodiments, an RFID tag may be embedded within a seat cushion during the cushion molding process. For example, a liquid expanding foam is poured into an internal cavity of a mold. An RFID tag is then placed in a desired position and/or orientation on a surface of the expanding foam. The foam expands to fill the contours of the internal cavity of the mold, thereby establishing a cushion having a desired shape. In addition, as the foam expands and cures, the foam bonds to the RFID tag on the surface of the foam (e.g., forms a mechanical bond between the RFID tag and the foam). Accordingly, the completed cushion includes an RFID tag embedded within the foam structure at a desired position and/or orientation. The bond between the RFID tag and the foam may be more secure than a bond established by physically coupling an RFID tag to a completed cushion. In addition, embedding an RFID tag within a foam cushion during the molding process may be less time consuming and/or less labor intensive than physically coupling an RFID tag to a completed cushion. Moreover, because the RFID tag is embedded within the cushion, the cushion may maintain a substantially flat surface, thereby substantially reducing or eliminating the possibility of inadvertently removing the RFID tag during later stages of the seat production process.

While a system and method for embedding an RFID tag within a seat cushion is described below, it should be appreciated that the system and method may be used to embed RFID tags within other vehicle components. For example, certain elements of a door panel, an instrument panel, and/or an armrest may be formed by injecting expandable foam into a mold cavity. As will be appreciated, the system and method described below may be employed to embed RFID tags within such elements.

As used herein, the terms "embed," "embedded," and "embedding" refer to an RFID tag that is at least partially united with a surrounding structure (e.g., a foam cushion of a seat back or seat bottom). It should be appreciated, that an RFID tag may be embedded within a surrounding structure without being fully enclosed within the surrounding structure. For example, as expanding foam fills an internal cavity of a mold, the RFID tag becomes embedded within the foam. As a result, the foam bonds to at least one surface of the RFID tag (e.g., forms a mechanical bond between at least one surface of the RFID tag and the foam). By way of example, if the shape of the RFID tag is a rectangular prism, fives sides of the prism may be in contact (e.g., bonded to) the foam, and the sixth side may be substantially flush with an exterior surface of the completed foam part. In such a configuration, the RFID tag is considered embedded within the foam part.

Figure 2:
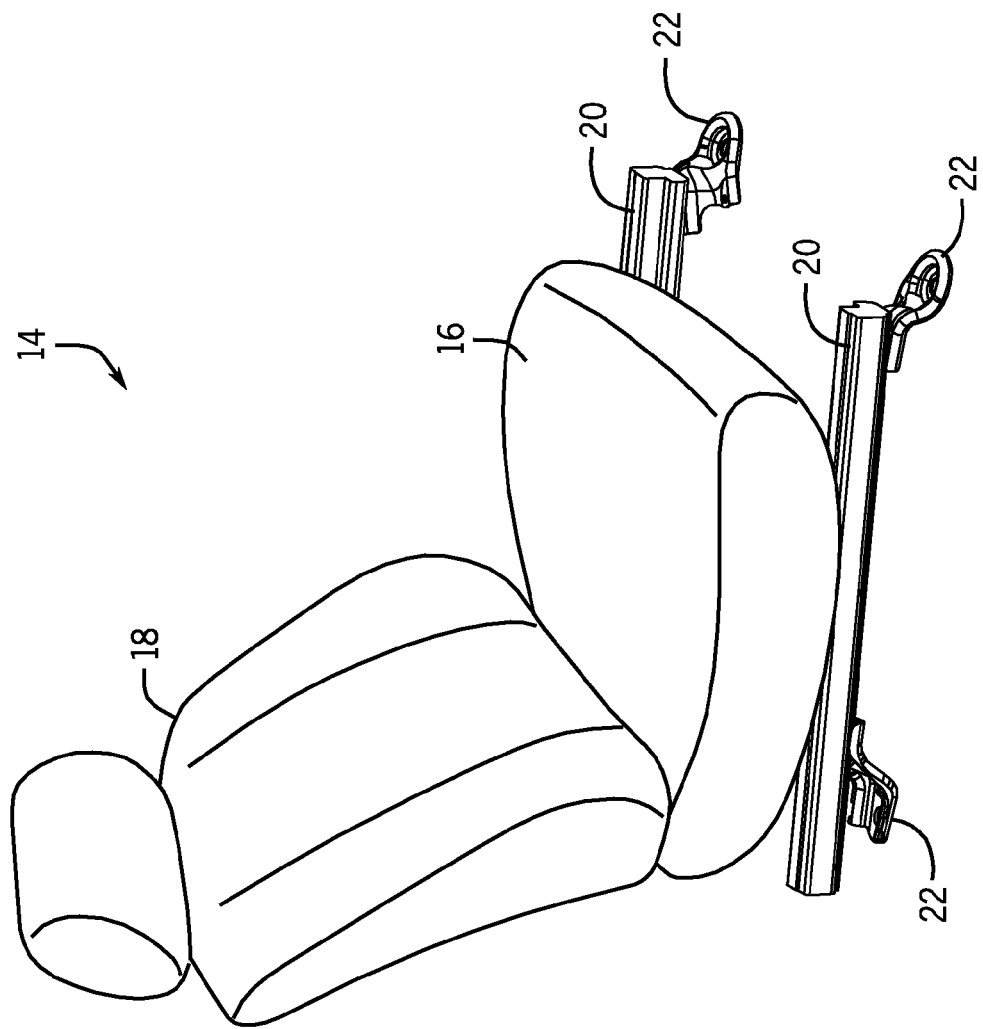
FIG. 2 is a perspective view of an exemplary vehicle seat that may include a cushion having an embedded RFID tag.

FIG. 2 is a perspective view of the vehicle seat 14 of FIG. 1. As illustrated, the seat 14 includes a seat bottom assembly 16 and a seat back assembly 18. In the present embodiment, the seat bottom assembly 16 includes a seat bottom chassis, one or more cushions, and a fabric covering. The seat bottom chassis serves to support the weight of an occupant during normal vehicle operation and during high g-force events (e.g., rapid acceleration or deceleration, etc.). The seat bottom chassis also secures the seat bottom assembly 16 to a floor of the vehicle 10, and provides a mounting surface for the seat back assembly 18. One or more cushions may be coupled to the seat bottom chassis to provide passenger comfort, and the fabric covering may be disposed about the cushion to provide a desired appearance and/or to protect the internal components of the seat bottom assembly 16. The seat back assembly 18 may be constructed in a similar manner, i.e., from one or more cushions secured to a rigid chassis and wrapped with a fabric covering. The cushions of the seat bottom assembly 16 and/or the seat back assembly 18 may each include an RFID tag that is embedded within the cushion during the molding process. Because the RFID tag is embedded during molding, the process of separately attaching a cushion identifier (e.g., an RFID tag, a bar code, etc.) is obviated. As a result, the duration and costs associated with manufacturing a cushion may be substantially reduced. In addition, because the RFID tag communicates via radio frequency signals, an RFID reader may scan an RFID tag positioned outside of a line-of-sight (e.g., an RFID tag obscured or blocked by other interior components), thereby facilitating identification of the cushion.

As illustrated, the seat bottom assembly 16 is secured to a seat track 20. The seat track 20, in turn, is secured to the floor of the vehicle 10 by mounting feet 22. In certain configurations, the seat 14 may be configured to translate along the seat track 20 to adjust a longitudinal position of a driver or passenger. As will be appreciated, adjustment of the seating position may be either manual or assisted. For example, an electric motor may be configured to drive the seat 14 along the track 20 by a suitable mechanism such as a rack and pinion system. In addition, the seat back assembly 18 may be configured to recline with respect to the seat bottom assembly 16. Adjustment of the seat back assembly 18 may also be either manual or assisted by an electric motor, for example.

Figure 3:
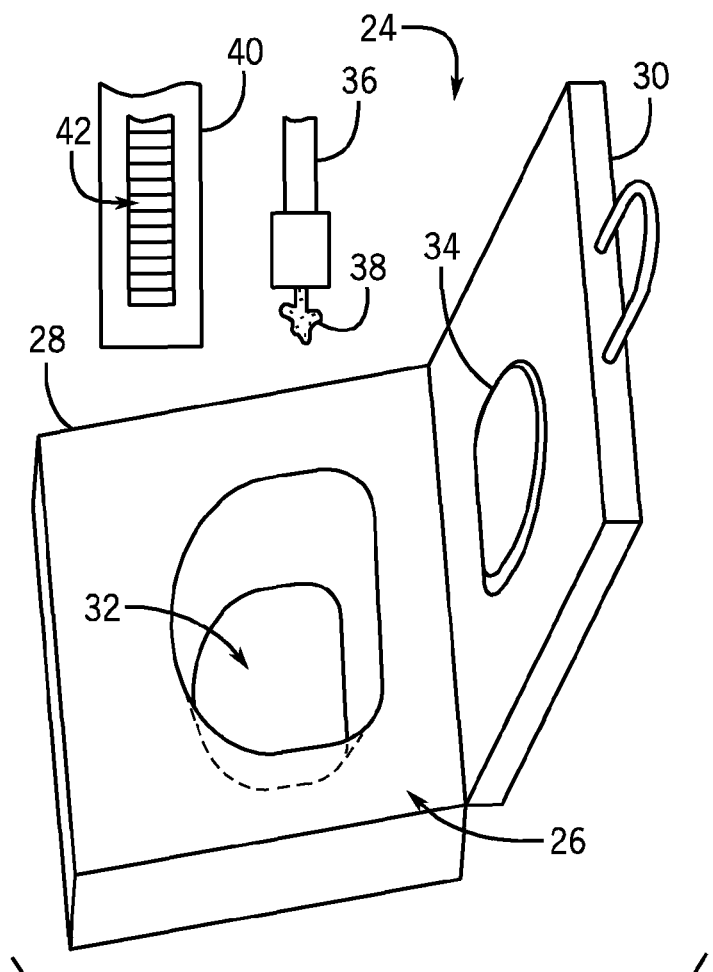
FIG. 3 is a perspective view of an embodiment of a system for forming an interior component having an embedded RFID tag.

FIG. 3 is a perspective view of an embodiment of a system 24 for forming an interior component having an embedded RFID tag. The system 24 includes a mold 26 configured to form cushions for the seat bottom assembly 16 and/or the seat back assembly 18, for example. In certain embodiments, at least a portion of the mold 26 is formed from cast aluminum. However, it should be appreciated that the mold 26 may include other suitable materials, such as stainless steel or plastic, for example. As illustrated, the mold 26 includes a body 28 and a lid 30, which form a "clamshell" type mold. The body 28 includes an internal cavity 32, which ultimately determines the shape of the interior component. In certain embodiments, the body 28 may include multiple internal cavities to form various elements of one or more interior components. In the illustrated embodiment, the lid 30 is configured to selectively cover an opening in an upper surface of the mold body 28. However, in alternative embodiments, the lid 30 may be configured to selectively cover an opening in a side or bottom surface of the body 28. As illustrated, the lid 30 includes a gasket 34 configured to establish a seal with the internal cavity 32, thereby substantially blocking a flow of expanding foam out of the opening.

The system 24 also includes a pour head 36 positioned above the opening in the internal cavity 32. The pour head 36 is configured to deliver (e.g., pour, inject, etc.) expanding foam 38, such as polyurethane foam, into the internal cavity 32. In certain embodiments, one pour head 36 may sequentially inject foam 38 into several internal cavities 32 to form multiple interior components. After the foam 38 is delivered to the internal cavity 32, the lid 30 may be closed to establish a substantially sealed chamber for forming the interior component. As will be appreciated, the foam 38 expands as it cures, there by filling the internal cavity 32, and forming an interior component having a shape that substantially corresponds to the shape of the internal cavity 32. In certain embodiments, the pour head 36 is moveable to facilitate displacement of the pour head 36 after the foam 38 is delivered to the internal cavity 32, thereby facilitating lid closure.

As discussed in detail below, an RFID tag is placed in a desired position and/or orientation on a surface (e.g., an upper surf ace) of the expanding foam 38. As the foam expands and cures, the foam bonds to the RFID tag (e.g., forms a mechanical bond between the RFID tag and the foam), thereby establishing an interior component having an RFID tag embedded within the foam structure. In the illustrated embodiment, the system 24 includes a hopper 40 configured to provide RFID tags 42 to the internal cavity 32. For example, the hopper 40 may be configured to automatically place an RFID tag in a desired position and/or orientation on a surface of the expanding foam 38. Alternatively, the hopper 40 may provide an RFID tag to an operator, thereby enabling the operator to place the RFID tag in a desired position and/or orientation on the surface of the expanding foam 38.

By way of example, the hopper 40 may be coupled to a positioning device (e.g., including electrical, pneumatic, and/or hydraulic actuators) configured to facilitate movement of the hopper 40 relative to the internal cavity 32 of the mold 26. After the expanding foam 38 is deposited within the internal cavity 32, the positioning device may align the hopper 40 with a desired RFID tag position and/or orientation on a surface of the expanding foam 38. The hopper 40 may then drop an RFID tag 42 onto the surface of the expanding foam 38 such that the RFID tag 42 bonds to the foam in the desired position and/or orientation as the expanding foam cures. In this manner, the RFID tag 42 may be located at a desired position and/or orientation within the completed foam part.

As will be appreciated, RFID tags 42 include an antenna and control circuitry. The antenna is both a receiving antenna and a transmitting antenna, designed to resonate at a particular frequency. Electrical energy is transferred from an RFID reader to the RFID tag 42 via a power/interrogation signal, which is received by the RFID tag antenna, and serves to power the control circuitry. The control circuitry holds a small amount of coded information, such as identification data, manufacture date, part number, etc. Certain embodiments employ "passive" control circuitry that does not have an independent power source, and does not initiate transfer of information except in response to a signal from the RFID reader. The power/interrogation signal from the RFID reader powers the control circuitry, and induces the control circuitry to generate a return signal encoded with the data stored in the control circuitry. In the present embodiment, the data may be used to identify a particular interior component, such as a particular cushion within the seat 14.

Figure 4:
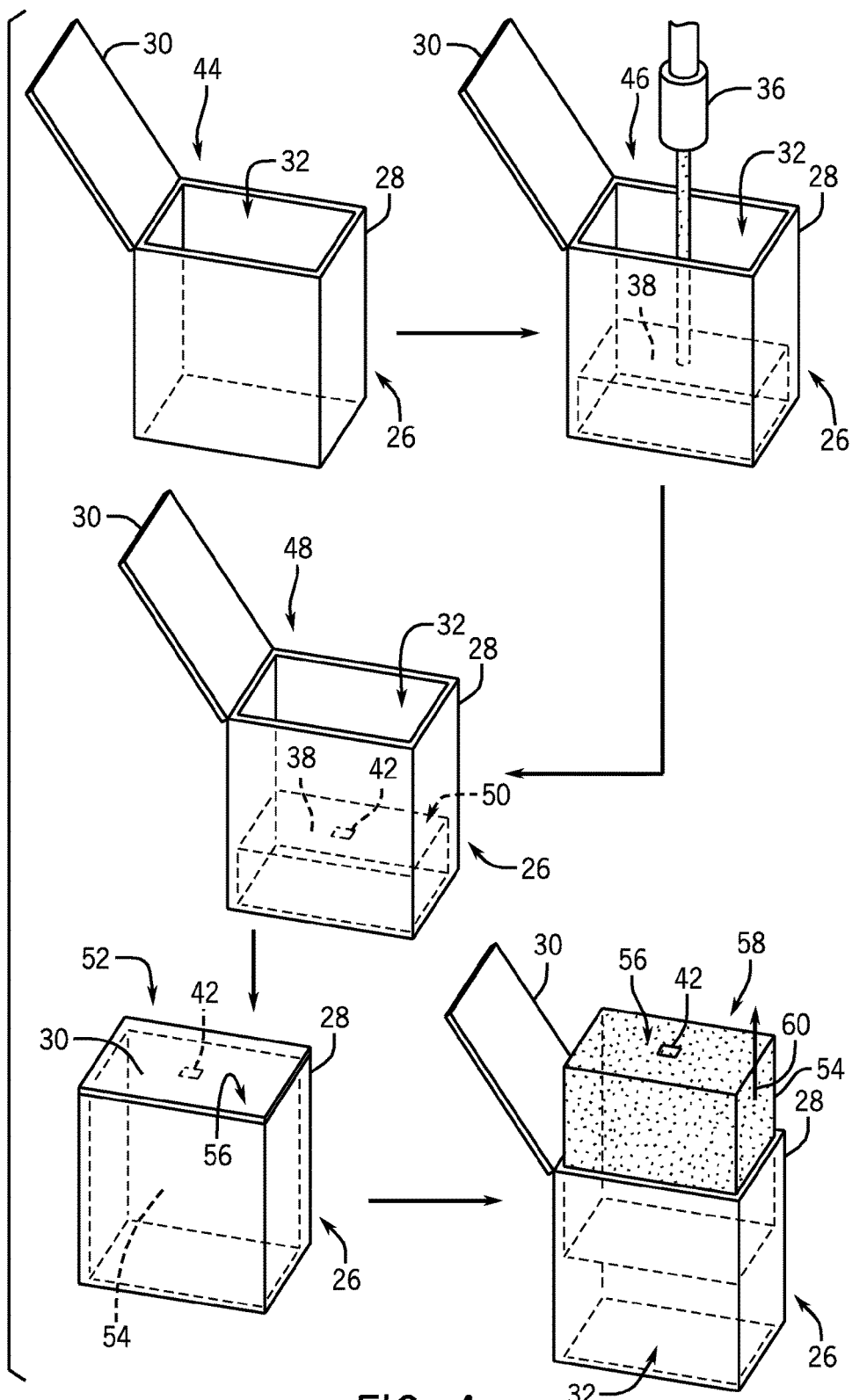
FIG. 4 is a schematic flow diagram of an embodiment of a method for forming an interior component having an embedded RFID tag.

FIG. 4 is a schematic flow diagram of an embodiment of a method of forming an interior component having an embedded RFID tag. First, as represented by step 44, the lid 30 of the mold 26 is in an open position, thereby enabling expandable foam to be deposited into the internal cavity 32 of the mold body 28. While the illustrated embodiment includes a substantially cubical mold 26, it should be appreciated that more complex mold shapes may be employed in alternative embodiments.

Next, as represented by step 46, the pour head 36 deposits or injects the expanding foam 38 into the internal cavity 32. As previously discussed, the foam 38 may be a polyurethane foam, or another type of suitable liquid expanding foam. Depending on the composition of the foam, a variety of components having different hardnesses and/or weights may be formed. If the component is a seat bottom cushion, a softer foam may be employed, and if the component is part of a headrest or a dashboard, a harder foam may be employed.

After the foam is deposited within the internal cavity 32, an RFID tag 42 is placed in a desired position and/or orientation on a surface of the expanding foam, as represented by step 48. For example, the hopper, which includes multiple RFID tags, may align an RFID tag with the desired position and/or orientation on the surface of the expanding foam 38. The hopper may then drop the RFID tag 42 onto the surface of the expanding foam. As the foam 38 expands and cures, the RFID tag 42 bonds to the foam 38 (e.g., forms a mechanical bond between the RFID tag and the foam). Accordingly, the completed interior component includes an RFID tag embedded within the foam structure at a desired position and/or orientation. In certain embodiments, the RFID tag 42 may be placed substantially flat against the surface of the expanding foam 38. In such embodiments, the RFID tag 42 remains flat against the surface of the foam as the foam expands and cures. As a result, the completed foam part includes an RFID tag embedded within the foam substantially flush with an outside surface. While the RFID tag 42 is placed on an upper surface 50 of the expanding foam 38 in the illustrated embodiment, it should be appreciated that the RFID tag 42 may be placed on a side surface or a bottom surface of the expanding foam in alternative embodiments. Furthermore, it should be appreciated that the process of placing the RFID tag on the surface of the expanding foam may be performed manually in alternative embodiments (e.g., via an operator removing the RFID tag from the hopper, and manually placing the RFID tag on the surface of the expanding foam).

As represented by step 52, the lid 30 is closed to enable the foam to completely fill the internal cavity 32 of the mold 26, thereby forming a foam component 54 having a shape substantially corresponding to the shape of the internal cavity 32. Because the RFID tag 42 is placed substantially flat against the upper surface 50 of the expanding foam 38, the RFID tag 42 becomes embedded substantially flush with a corresponding surface 56 of the foam component 54. By way of example, the surface 56 may correspond to a lower surface of a seat bottom cushion (e.g., a surface facing a floor of the vehicle interior). When the foam has finished curing, as represented by step 58, the foam component 54 is extracted from the mold in a direction 60. Because the RFID tag is embedded within the foam component, the component 54 may be tracked as it travels through the production process, and identified after it has left the production facility.

Figure 5:
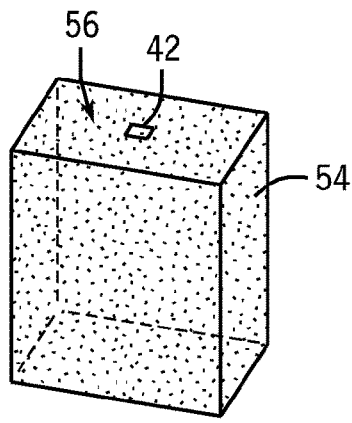
FIG. 5 is a perspective view of an embodiment of a vehicle interior component having an embedded RFID tag.

FIG. 5 is a perspective view of an embodiment of a vehicle interior component 54 having an embedded RFID tag 42. While the illustrated embodiment includes a substantially cubical interior component 54, it should be appreciated that alternative embodiments may include interior components having a variety of shapes and/or sizes based on the desired application of the component. In certain embodiments, the foam of the component 54 may be substantially homogenous due to uniform expansion of the foam within the internal cavity of the mold. In the illustrated embodiment, a single RFID tag 42 is embedded within the surface 56 of the vehicle interior component 54. However, it should be appreciated that certain embodiments may include more RFID tags (e.g., 2, 3, 4, 5, 6, or more) embedded within one or more surfaces of the component 54, and/or within an interior of the component 54. In the illustrated embodiment, the RFID tag 42 is embedded within the surface 56 of the component 54 such that the RFID tag 42 is substantially flush with the surface 56. Accordingly, communication with an RFID reader positioned adjacent to the surface 56 may be substantially enhanced, as compared to RFID tags that are angled relative to the surface. In addition, because the RFID tag is substantially flush with the respective surface, the interior component may have a substantially smooth surface, thereby enhancing the appearance of the component.

Figure 6:
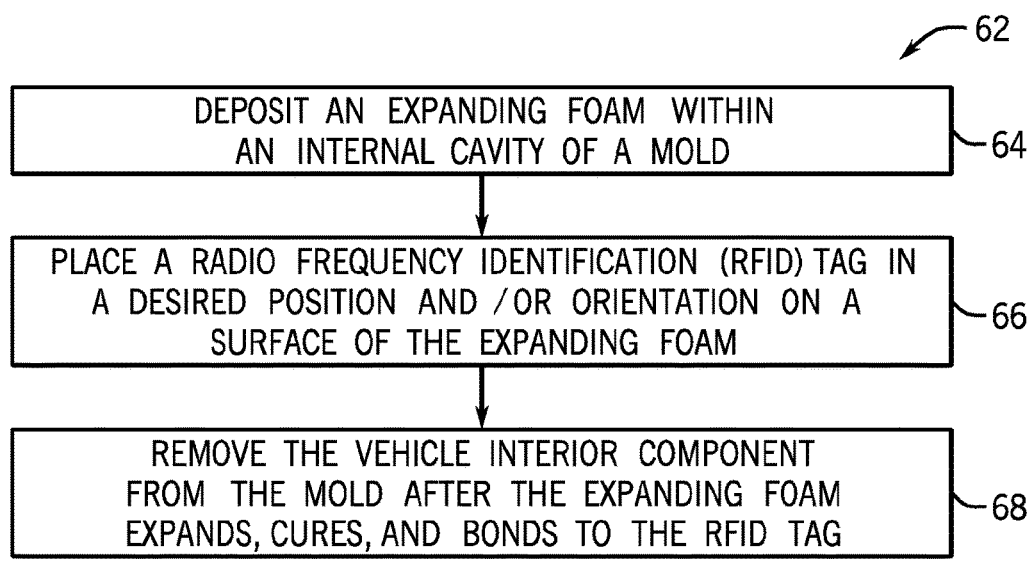
FIG. 6 is a flowchart of an embodiment of a method for manufacturing a vehicle interior component having an embedded RFID tag.

FIG. 6 is a flowchart of an embodiment of a method 62 for manufacturing a vehicle interior component having an embedded RFID tag. First, as represented by block 64, expanding foam is disposed within an internal cavity of a mold. Next, as represented by block 66, an RFID tag is placed in a desired position and/or orientation on a surface of the expanding foam. For example, the hopper may be aligned with the desired position and/or orientation, and the RFID tag may be dropped from the hopper onto the surface of the expanding foam. The foam expands to fill the contours of the internal cavity of the mold, thereby establishing an interior component having a desired shape. In addition, as the foam expands and cures, the foam bonds to the RFID tag on the surface of the foam (e.g., forms a mechanical bond between the RFID tag and the foam). Accordingly, the completed interior component includes an RFID tag embedded within the foam structure at a desired position and/or orientation. At block 68, the vehicle interior component is removed from the mold after the expanding foam has expanded, cured, and bonded to the RFID tag. Embedding an RFID tag within an interior component during the molding process may be less time consuming and/or less labor intensive than physically coupling an RFID tag to a completed component. Accordingly, the manufacturing costs of foam vehicle interior components may be substantially reduced.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for manufacturing a vehicle interior component comprising:
   depositing an expanding foam within an internal cavity of a mold, wherein the internal cavity is shaped to form the vehicle interior component; and
   placing a radio frequency identification tag in a desired position, orientation, or a combination thereof, on a surface of the expanding foam such that the expanding foam bonds to the radio frequency identification tag as the expanding foam cures.

2. The method of claim 1, wherein placing the tag on the surface of the expanding foam comprises aligning a hopper with the desired position, orientation, or a combination thereof, and dropping the radio frequency identification tag from the hopper onto the surface of the expanding foam.

3. The method of claim 2, wherein the hopper is configured to hold a plurality of radio frequency identification tags, and to sequentially dispense the plurality of radio frequency identification tags into the internal cavity of the mold.

4. The method of claim 1, wherein the desired position, orientation, or a combination thereof, is selected such that the radio frequency identification tag is readable by an radio frequency identification reader external to the vehicle interior component.

5. The method of claim 1, wherein the vehicle interior component comprises a cushion for a seat back assembly, or a cushion for a seat bottom assembly.

6. The method of claim 1, wherein the desired position, orientation, or a combination thereof, is substantially flat against the surface of the expanding foam and the radio frequency identification tag becomes embedded in the foam with an outer surface of the radio frequency identification tag substantially flush with a corresponding outer surface of the foam component.

7. The method of claim 1, comprising removing the vehicle interior component from the mold after the expanding foam has expanded, cured, and bonded to the radio frequency identification tag.

8. A system for manufacturing a vehicle interior component comprising:
   a mold having an internal cavity shaped to form the vehicle interior component, wherein the internal cavity is configured to receive expanding foam; and
   a hopper configured to place a radio frequency identification tag in a desired position, orientation, or a combination thereof, on a surface of the expanding foam such that the expanding foam bonds to the radio frequency identification tag as the expanding foam cures, wherein:
   the desired position, orientation, or a combination thereof, is substantially flat against the surface of the expanding foam; and
   the internal cavity shape of the mold corresponds in at least a location with an outer shape of the radio frequency identification tag whereby the radio frequency identification tag becomes embedded in the foam with an outer surface of the radio frequency identification tag substantially flush with a corresponding outer surface of the foam component.

9. The system of claim 8, wherein the hopper is configured to hold a plurality of radio frequency identification tags, and to sequentially dispense the plurality of radio frequency identification tags into the internal cavity of the mold.

10. The system of claim 8, wherein the desired position, orientation, or a combination thereof, is selected such that the radio frequency identification tag is readable by a radio frequency identification reader external to the vehicle interior component.

11. The system of claim 8, wherein the mold comprises a base having the internal cavity, and a lid configured to selectively cover the internal cavity.

12. The system of claim 8, wherein the surface of the expanding foam comprises an upper surface of the expanding foam.

13. The system of claim 8, wherein:
   the vehicle interior component comprises a cushion for a seat back assembly.

14. A system for manufacturing a vehicle interior component comprising:
   a mold having an internal cavity shaped to form the vehicle interior component, wherein the internal cavity is configured to receive expanding foam; and
   a hopper configured to place a radio frequency identification tag in a desired position, orientation, or a combination thereof, on a surface of the expanding foam such that the expanding foam bonds to the radio frequency identification tag as the expanding foam cures, wherein:
   the desired position, orientation, or a combination thereof, is substantially flat against the surface of the expanding foam;
   the internal cavity shape of the mold corresponds in at least a location with an outer shape of the radio frequency identification tag whereby the radio frequency identification tag becomes embedded in the foam with an outer surface of the radio frequency identification tag substantially flush with a corresponding outer surface of the foam component; and
   the vehicle interior component comprises a cushion for a seat bottom assembly.

* * * * *